United States Patent
Hill

(10) Patent No.: US 8,903,176 B2
(45) Date of Patent: Dec. 2, 2014

(54) SYSTEMS AND METHODS USING OBSERVED EMOTIONAL DATA

(71) Applicant: Daniel A. Hill, St. Paul, MN (US)

(72) Inventor: Daniel A. Hill, St. Paul, MN (US)

(73) Assignee: Sensory Logic, Inc., Minneapolis, MN (US)

( * ) Notice: Subject to any disclaimer, the term of this patent is extended or adjusted under 35 U.S.C. 154(b) by 147 days.

(21) Appl. No.: 13/676,296

(22) Filed: Nov. 14, 2012

(65) Prior Publication Data
US 2013/0121591 A1 May 16, 2013

Related U.S. Application Data

(60) Provisional application No. 61/559,582, filed on Nov. 14, 2011.

(51) Int. Cl.
*G06K 9/46* (2006.01)
*G06K 9/00* (2006.01)

(52) U.S. Cl.
CPC .............. *G06K 9/46* (2013.01); *G06K 9/00302* (2013.01); *G06K 9/00845* (2013.01)
USPC .......................................... 382/195; 715/753

(58) Field of Classification Search
CPC .......... G06K 9/00302; G06K 9/00335; G06K 9/00845; G06K 9/46; G06K 9/4609; G06K 9/6203; G06K 9/20; G06T 7/0081; G06T 5/001
USPC ........................................... 382/195; 715/753
See application file for complete search history.

(56) References Cited

U.S. PATENT DOCUMENTS

| | | |
|---|---|---|
| 6,422,999 B1 | 7/2002 | Hill |
| 6,453,194 B1 | 9/2002 | Hill |
| 7,113,916 B1 | 9/2006 | Hill |
| 7,120,880 B1 | 10/2006 | Dryer et al. |
| 7,181,693 B1 * | 2/2007 | Anderson et al. ............. 715/745 |
| 7,246,081 B2 | 7/2007 | Hill |
| 7,930,199 B1 | 4/2011 | Hill |
| 8,235,725 B1 | 8/2012 | Hill |
| 2010/0266213 A1 | 10/2010 | Hill |
| 2011/0038547 A1 | 2/2011 | Hill |
| 2012/0002848 A1 | 1/2012 | Hill |
| 2012/0046993 A1 | 2/2012 | Hill |
| 2012/0143693 A1 | 6/2012 | Chung et al. |
| 2013/0331729 A1 * | 12/2013 | de Lemos et al. ............. 600/558 |

* cited by examiner

*Primary Examiner* — Ruiping Li
(74) *Attorney, Agent, or Firm* — Schwegman Lundberg & Woessner, P.A.

(57) ABSTRACT

Systems and techniques using observed emotional data are described herein. A sequence of visual observations of a subject can be received during execution of an application. An emotional state of the subject can be determined based on the sequence of visual observations. Execution of the application can be modified from a baseline execution using the emotional state.

15 Claims, 6 Drawing Sheets

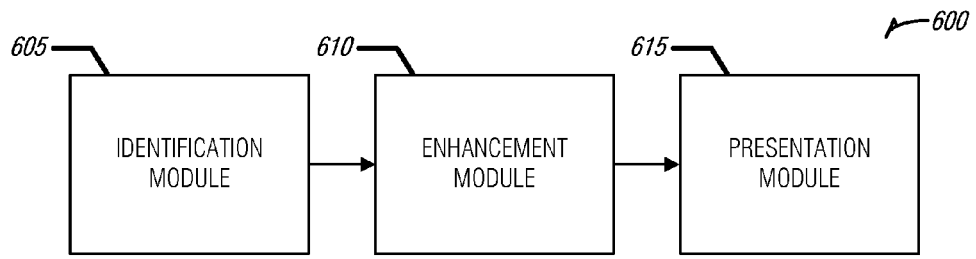
FIG. 6
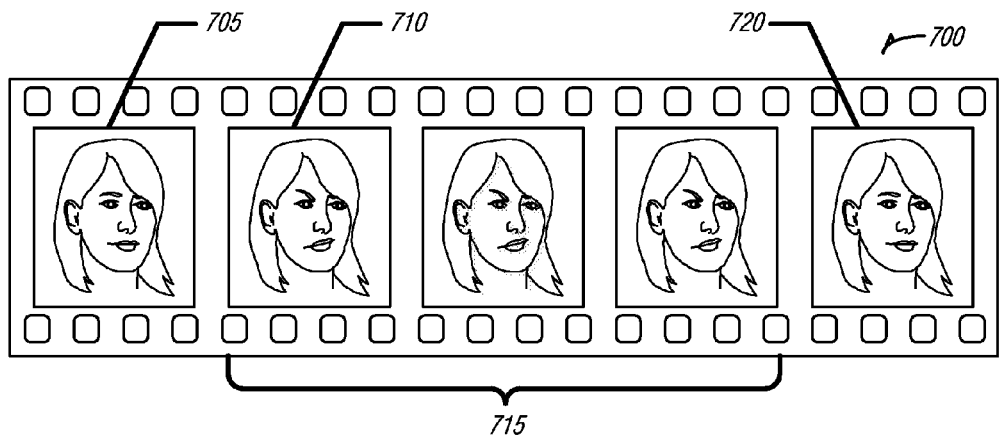
FIG. 7
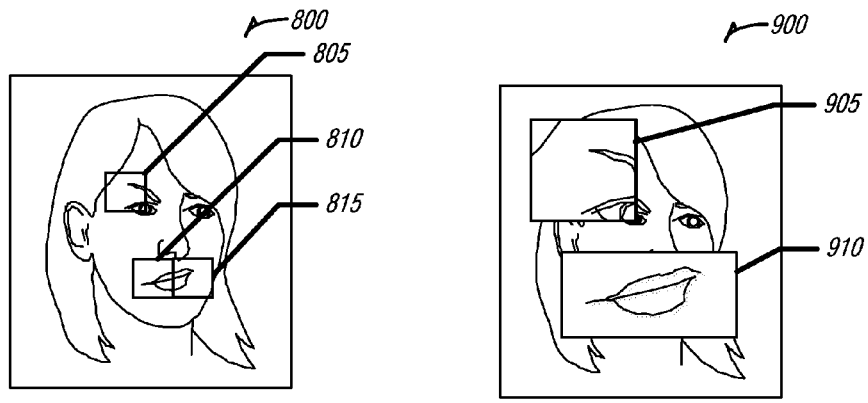
FIG. 8     FIG. 9

SYSTEMS AND METHODS USING OBSERVED EMOTIONAL DATA

CLAIM OF PRIORITY

This patent application claims the benefit of priority, under 35 U.S.C. §119(e), to U.S. Provisional Patent Applicant Ser. No. 61/559,582, titled "SYSTEMS AND METHODS USING OBSERVED EMOTIONAL DATA," filed Nov. 14, 2011, which is hereby incorporated by reference in its entirety.

BACKGROUND

Applications (e.g., computer games, interactive forms, word processors and other productivity programs, mobile applications, etc.) often include a user interface through which a user interacts with the application. User interfaces can vary widely, but usually include one or more input devices (e.g., mouse, keyboard, touch screen, etc.) manipulated by the user to interact with the application. The user interface generally includes observable elements (e.g., visual elements such as graphics, icons, fields; audio elements; haptic feedback such as vibrations among others) that present an environment to which the user interacts. It is often a goal of user interface designers to balance the capabilities of the interface (e.g., how much a user can accomplish with the user interface) with increasing the ease with which the user can use the interface.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates an example of a system for facilitating human facial coders, according to an embodiment.

FIG. 7 illustrates an example of a media source of facial images, according to an embodiment.

FIG. 8 illustrates an example of a facial image with identified media aspects, according to an embodiment.

FIG. 9 illustrates an example of an enhanced media source, according to an embodiment.

DETAILED DESCRIPTION

Figure 1:
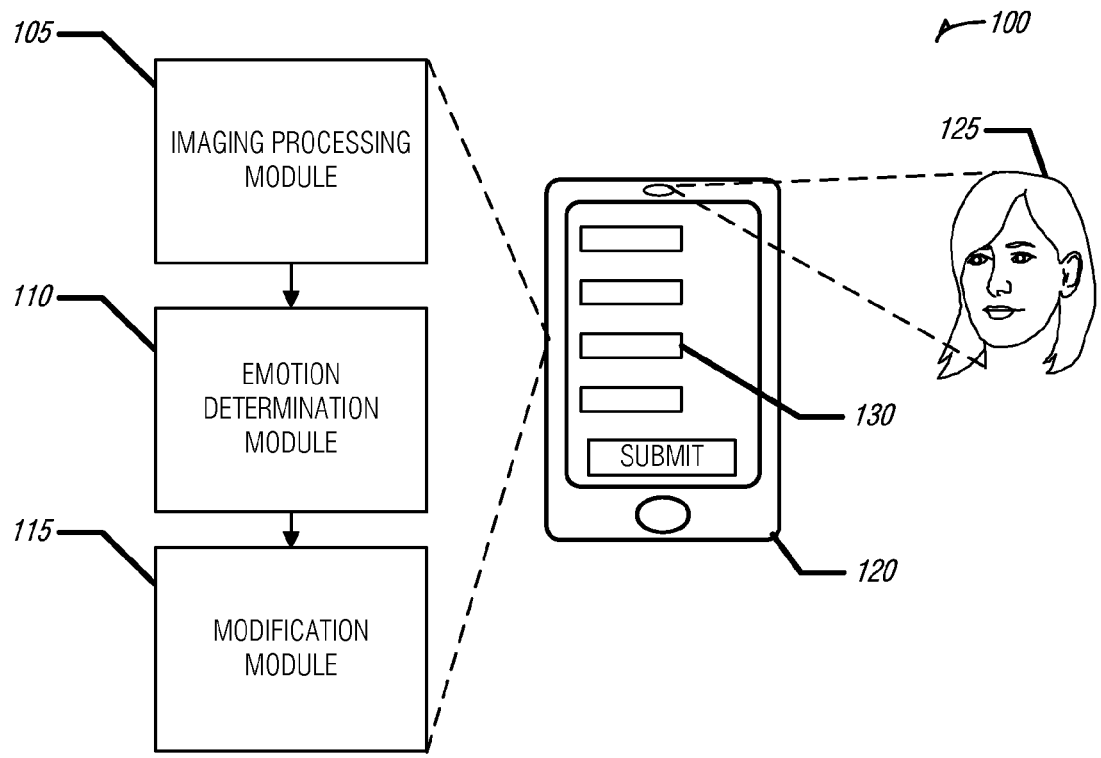
FIG. 1 illustrates an example of a system for emotionally sensitive application operation, according to an embodiment.

Application user interfaces can be improved by dynamically modifying the application's behavior based on observed emotional states of a subject. For example, where the subject is the user of the application, a game may use a camera as an additional input device to observe the face of the subject during play. The observations may be used to determine that the user is, for example, growing bored with the game. In response to this determination, the game may change to present additional challenges to the user in an effort to increase user interest. In an example, the application can be an interactive form, such as a tax form. The camera may both be used to gather emotionally relevant observations as well as corresponding application targets (e.g., a particular field to be completed). This data can be used to, for example, provide the user with additional help for the field (e.g., a pop-up tutorial, offer of chatting with live representative, presentation of frequently asked questions (FAQs), etc.) when the user is frustrated while dealing with the field.

In an example the user and subject can be different, such as an application that monitors patients in a hospital. In this example, the user can be a nurse while the subject is a patient. Visual (or non-visual) emotional cues can be observed by a patient monitor and an emotional state for the patient can be determined. If, for example, the emotional state indicates surprise, alarm, or other emotional state that can indicate a problem, the monitor may changes to alert (e.g., via sound, changed text, changed colors, paging the user, etc.) the nurse. In an example, the user can be an automated system, such as a car control system. In this example, the subject can be the car's driver. The system can determine, through visual observations, that the driver is experiencing one or more emotions that can lead to dangerous behavior, such as frustration, anger, etc. In response, the system can implement mitigation procedures, such as controlling the car's maximum speed, sounding an alarm, contacting a family member, or taking control of the vehicle.

Using observed emotional data can permit a user interface designer to increase the capabilities of the interface while providing a method to identify and adapt to problem areas of the interface. This approach can increase user satisfaction and thus the value of the application. Additional details are given below including with regard to FIGS. 1-3.

An example application for observed emotional data is in measuring the veracity of a person's oral representations. For example, observed emotional data can be used to determine if a politician delivering a promise at a campaign event believes in the promise, or in her ability to deliver on the promise. Such observed emotional data can, for example, be illustrated on a video stream of the campaign event, such as a televised debate. However, an observer (e.g., constituent) may be taxed to connect which emotions are directed to which words in the speech. Emotional observations of the subject (politician) can be used in conjunction with semantic understanding of the politician's words or phrases to automatically augment the presentation to observers. A say-feel gap (e.g., the difference between the meaning of the word and the emotional state of the speaker) can be determined. This say-feel gap can be used to, for example, modify the pitch, tone, or magnitude of the speech's audio to indicate the confidence the speaker has in her words. In this example, baseline operation (e.g., unmodified audio) can be presented of the speech until the promise, which the politician does not intend to keep. At this juncture, the audio can be changed to be lower in tone and quieter, to indicate the politician's lack of confidence. Conversely, the audio can be made louder to illustrate a portion of the speech in which the politician is particularly confident. In an example, the transcript of the speech can be presented to the observer. Strings (e.g., words or phrases) in the transcript can be marked (e.g., highlighted, enlarged, changed in color, etc.)

to represent the emotional state of the speaker correlated to the string. Additional details are given below including with regard to FIGS. 3-5.

The emotional state determination discussed above can be automatically accomplished from the observed emotional indicators and applied in real-time, or near real-time to modify the described applications. However, trained human facial coders, for example, can still provide valuable emotional state determinations in many situations. For example, in product marketing campaigns, video of a target group can be gathered while members of the group interact with a product. This video can be used by human facial coders to identify emotional indicia that can be used to determine the subject's emotional state. This information can be compiled and presented to a customer in a report. In an example, human facial coders can be used to increase the accuracy of emotional state determination over that of some automated systems. However, the rapidity with which an emotional queue may pass (e.g., sub-second expression in video) and the possibility for long media sources (e.g., observing a long video) can lead to the problem whereby the facial coder must manually speed, slow, and rewind the media source to perform their function. This problem can be addressed by enhancing the media source based on an emotional determination system. For example, emotional indicia can be determined for a media source (e.g., a video). This indicia can be enlarged, color coded, or the video slowed, to help the human coder identify the appropriate emotional indicia. In an example, the individual emotional elements can be separated from the media source to, for example, anonymize the data or to allow these discrete elements to be processed by one or more different facial coders. This data can then be sent to multiple human facial coders (e.g., group or crowd-sourcing) to perform the analysis. In an example, the enhanced media source can include a "first pass" analysis that is presented and confirmed (or corrected) by the human coder. Additional details are given below including with regard to FIGS. 3 and 6-11.

Enhancing applications with observed emotional data for a subject can increase the usability and utility of a variety of applications as described above. This can lead to increased productivity, user satisfaction, and other benefits for application developers, purveyors, and consumers.

FIG. 1 illustrates an example of a system 100 for emotionally sensitive application operation. The system 100 can include a device 120. The device 120 can include an image processing module 105, an emotion determination module 110, and a modification module 115. In an example, any one or more of the image processing module 105, emotion determination module 110, or the modification module 115 can be remote, such as in a network or cloud server of a service provider.

The image processing module 105 can be configured to receive a sequence of visual observations of a subject 125 during execution of an application. As illustrated in FIG. 1, the device 120 includes a camera to observe the subject 125. In an example, the camera can be a peripheral to the device 120. In an example, the camera can be a stand-alone camera (e.g., camcorder) or other remote device positioned in such a way as to observe the subject 125.

The emotion determination module 110 can be configured to determine an emotional state of the subject 125 based on the sequence of visual observations. The emotion determination module 110 can be configured to automatically determine the emotional state based on an emotional determination system. Some examples of such systems are discussed below with regard to FIG. 3. However, any system by which an emotional state for a subject 125 can be determined by observing the subject 125 can be used. In an example, the emotion determination module 110 can be configured to relay application state information to an external source where the emotional state determination can be performed. The emotion determination module 110 can then communicate the emotional state determination to other modules of the device 120. In an example, this remote emotional state determination can be manual (e.g., performed, at least in part, by a human).

In an example, the emotion determination module 110 can be configured to identify a stimulus corresponding to the determined emotional state. For example, eye-tracking software and an additional camera positioned so as to capture what the subject 125 is looking at can be used to produce an image, or otherwise identify, what object the subject 125 is observing for the determined emotional state. In an example, the single camera, alone, can identify the position of the subject's 125 eyes. That position can be correlated to an object rendered to the screen; the object being the identified stimulus.

The modification module 115 can be configured to modify execution of the application from a baseline execution using the emotional state. In an example, the modification module 115 can be configured to store a correlation between the emotional state and the identified stimulus (discussed above). Memorializing the pairing between these two data points can be used to provide further application enhancements, such as reporting this data at a later date or sharing it with others.

Using the above modules an application can better interact with its users. Such use of observed emotional data can provide better outcomes in user interface interactions. Below are several example scenarios for application interaction that can be enhanced in this way.

In an example, the application can be a social media application. Such an application can include an interface in which the subject 125 (user in this scenario) can post information (e.g., biographical information, pictures, group affiliations, etc.) about themselves, identify various circles of trust (e.g., friends) with other members, play games, etc. An example activity that the subject 125 can engaged in is to view articles (e.g., posts by other members) groups, products, etc., and rate them (e.g., numerically, "liking" or "disliking" them, etc.). In this example, the identified stimulus discussed above can be such an article. Also in this example, the stored correlation (between the emotional state of the subject 125 and the stimulus) can be the rating. That is, whether the subject 125 liked, disliked, or was neutral (in an example also including the magnitude of this feeling) on the article can be used to later inform others (e.g., friends, marketers, advertisers, etc.) of the subject's feelings towards the article.

In an example, the application can be a consumer marketing application. An example of such an application can include a smart-phone application that the subject 125 can used to aid in shopping. Other such applications can include online shopping, or even general browsing applications in which product, group (e.g., charities, political candidates, etc.), or services can be viewed. In an example, the stimulus can be presented in a consumer context (e.g., while shopping). In an example, the stimulus can be presented in a research context, such as a product being presented to a market research group. In these examples, the correlation can be a representation of the emotional state in a modified sequence of images correlated to the stimulus. For example, the video of the stimulus (e.g., of a product on the shelves at the grocery store) can be modified to place an emotional rating proximate to the product. In an example, the stimulus can be captured (e.g., in a picture or label) and placed on video of the subject 125 during observance of the emotional state. This placing can include color coding, or other manipulations, to visually identify a specific emotion, or an emotional summarization (e.g., like, dislike, etc.).

In an example, the application can be an interactive application. An interactive application refers to continually inputting information by the subject 125 and a user interface that is responsive to such inputs. Examples of such interactive applications can include games (e.g., video or computer games), forms (e.g., data entry into one or more fields, etc.), productivity applications (e.g., word processors, spreadsheets, presentation tools, graphical drafting tools, etc.), among others. FIG. 1 illustrates an interactive application on the device 120 using fields. In this example, the identified stimulus is the field 130. In this example, the application includes additional help services for the field 130. Examples of such additional help can include an expanded set of text, link to frequently asked questions (FAQ), or interactive support (e.g., connection to a machine or human that can ask questions and provide answers). In this example, a baseline emotional state can be established. In an example, establishing the baseline state can be accomplished beforehand, such as through user testing of the application. In an example, the baseline state can be determined dynamically by observing the subject 125 for a period of time. In an example, a threshold can be determined. This threshold can be used to demarcate an acceptable user experience from one that has become too frustrating, difficult, or otherwise undesirable. The modification module can be configured to present the additional help to the subject 125 in response to the emotional state crossing the threshold. In this way, the user interface can generally remain uncluttered and permit those without difficulty from being burdened with the additional help while enhancing the user experience for those who experience difficulty.

In an example, the application is interactive and can comprise one or more elements. For example, in a game, the elements can include such things as music, sound effects, sound volume, lighting effects, difficulty level, etc. For any given element, a plurality of alternative items can be used in its place. For example, for an element such as timing between surprise encounters with characters in a game (e.g., in the action or horror genres) two or more alternative timings exist and can be used interchangeably. In an example, the modification module 115 can be configured to select a next element from the plurality of alternative items to replace the current element. For example, in a horror game, the emotional state may indicate that the subject 125 has become bored. Elements such as lighting, music, or surprise encounters can be replaced with alternatives (e.g., that are more spooky) to keep the subject 125 interested. Examples can include decreasing the difficulty level when the subject 125 becomes frustrated, increasing the frequency of encounters similar to those in which the subject 125 expressed interest, etc.

In an example, the application can be a monitoring application. Examples of such applications can include patient observations systems, worker observations systems (e.g., power plant operator observation systems), or vehicle operator observations systems. With monitoring applications, the user may be a different entity than the subject 125. In an example, the user may be a machine, such as a vehicle control system, or other control system. In these examples, the modification module 115 can be configured to intervene on behalf of the subject 125. In an example, to intervene, the modification module 1125 can be configured to present an alarm to at least one of the subject or the user. For example, the alarm can take the form of a sound, page, call, etc. to a nurse observing a patient. In an example, the alarm can include a sound, vibration, or other notification to a driver who has become too angry, thus provide a way for the driver to recognize her own anger and work to mitigate the problem. In an example, the modification module 115 can be configured to manipulate a physical aspect of the subject's 125 environment. For example, with an angry driver, the modification module 115 can be configured to limit the maximum speed of the vehicle, slow the vehicle to a stop, etc. Other example environmental manipulations can include changing the temperature, lighting, or sound (e.g., music) of the environment.

Figure 2:
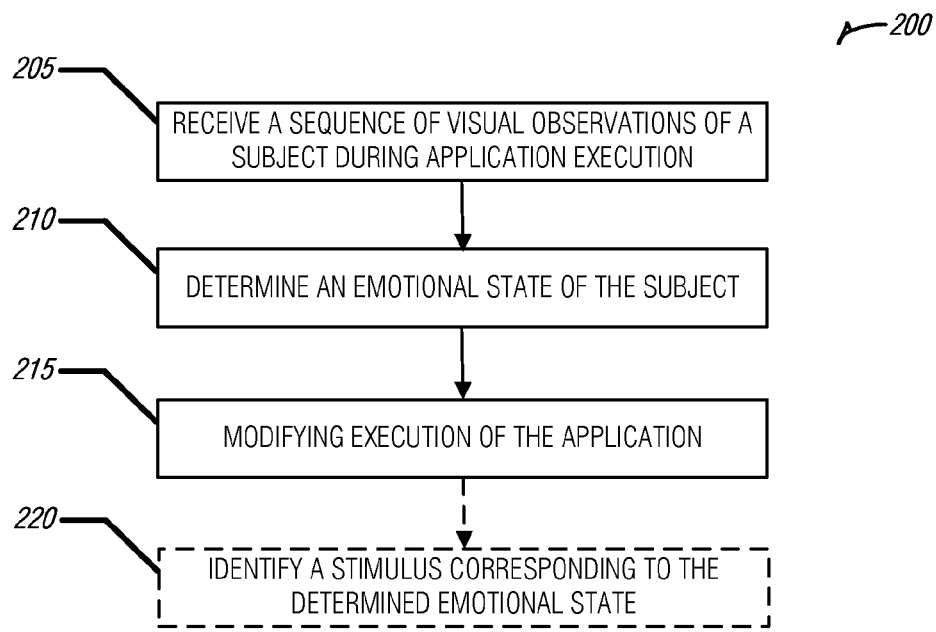
FIG. 2 illustrates an example of a method for emotionally sensitive application operation, according to an embodiment.

FIG. 2 illustrates an example of a method 200 for emotionally sensitive application operation. In an example, components of the system 100 can be used to implement one or more operations described below.

At operation 205, a sequence of visual observations of a subject during execution of an application can be received. In an example, the subject can be continuous monitored during the application's execution to obtain the sequence of visual observations.

At operation 210, an emotional state of the subject can be determined based on the sequence of visual observations. In an example, this determination can operate as discussed above with respect to FIG. 1.

At operation 215, the execution of the application can be modified from a baseline execution using the emotional state. In an example, the baseline execution of the application is the default execution of the application. For example, in a game with a given difficulty level, the baseline execution is the game at the defined difficulty level as defined by the game's designers. Accordingly, the modification from the baseline execution is an execution that deviates from this baseline execution. In an example, the application can be a monitoring application, the emotional state can cross a threshold from a baseline emotional state, and an intervention can be performed on behalf of the subject. For example, a monitored patient can have an emotional baseline established during an observation period. This can account for the peculiar emotional states of the monitored subject. The monitoring can continue, for example, throughout the night of the patient's stay in a hospital. At some point in the night, the patient may suddenly demonstrate alarm, surprise, or other emotion indicative of a problem or need for attention. The application can alert an observer (e.g., user, nurse, doctor, etc.) of the changed emotional condition. In this way, a patient can quickly receive attention to a potential problem. In an example, the intervention can include presenting an alarm to at least one user (e.g., the subject or a different party). In an example, the intervention can include manipulating a physical aspect of an environment of the subject. For example, a vehicle operator can be monitored. The environment can be the vehicle. The physical aspect can be a speed control, braking control, environment control (e.g., heat, cooling, music, lighting, etc.). Thus, for example, the intervention can include playing soothing music while dimming the lights to sooth a driver who is observed to express fear or anxiety.

At operation 220, a stimulus corresponding to the determined emotional state can be identified. In an example, a correlation between the emotional state and the stimulus can be stored to modify the execution of the application in operation 215. In an example, the stimulus can include a visual object (e.g., icon, field, etc.) of a user interface presented to the subject. In an example, the stimulus can be identified using eye tracking techniques and a representation of what the subject is seeing. For example, eye tracking techniques can be used to identify a screen region that the subject is looking at. The user interface rendering engine can be used to provide the object present in that screen region, which is the stimulus. In an example, the stimulus can be identified non-visually, such as by touch. In this example, a touch sensor (e.g., capacitive, light-base, resistive, etc.) can be used to identify the touch. In an example, visual processing of the subject's fingers (e.g., observing the fingers and performing image analysis to determine their location) can be used to identify the stimulus.

In an example, the application can be a social media application, the stimulus can be an article (e.g., post, message, etc.) presented to the subject by the social media application, and the correlation can be an indication of one or more of "like", "dislike", or "neutral" based on the emotional state. In an example, the application can be a consumer marketing application, the stimulus can be presented in a consumer context (e.g., on a shelf in a market, or on a vendor's website), and the correlation can be a representation of the emotional state in a modified sequence of images correlated to the stimulus, the modified sequence of images including the sequence of images. In this example, the modified sequence of images can include highlighting, circling, color coding, enlarging, or any other combination of visual or audio cues to illustrate the emotional state of the subject with specificity to the product. For example, the product can be outlined in red when the emotional state is anger.

In an example, the application can be an interactive application. In this example, the stimulus can be a portion of the application for which help is available, such as a field, menu selection, etc. In this example, the emotional state can cross a threshold from a baseline emotional state (e.g., from neutral to frustrated). For example, a calm person may experience a degree of anger sufficient to cross the threshold. In this example, after the threshold is crossed, the help can be presented the help to the subject (user in this example).

In an example, the application can be an interactive application, the stimulus can be an element of the interactive application (e.g., graphic, character, sound track, lighting element, map, difficulty, etc.), the element is one of a plurality of alternative items (e.g., in a game with a plurality of difficulty levels, the alternative items can each be a specific difficulty level), and a next element can be selected from the plurality of alternative items based on the emotional state. In this example, the next element replaces the element in the interactive application. For example, given a horror computer game, the emotional state can indicate that the subject has become overly anxious. In this example, the element can be the level of illumination given the environment presented by the game. The alternative items can include a variety of illumination levels. In this way a higher illumination level than the current level can be selected to reduce subject anxiety.

Figure 3:
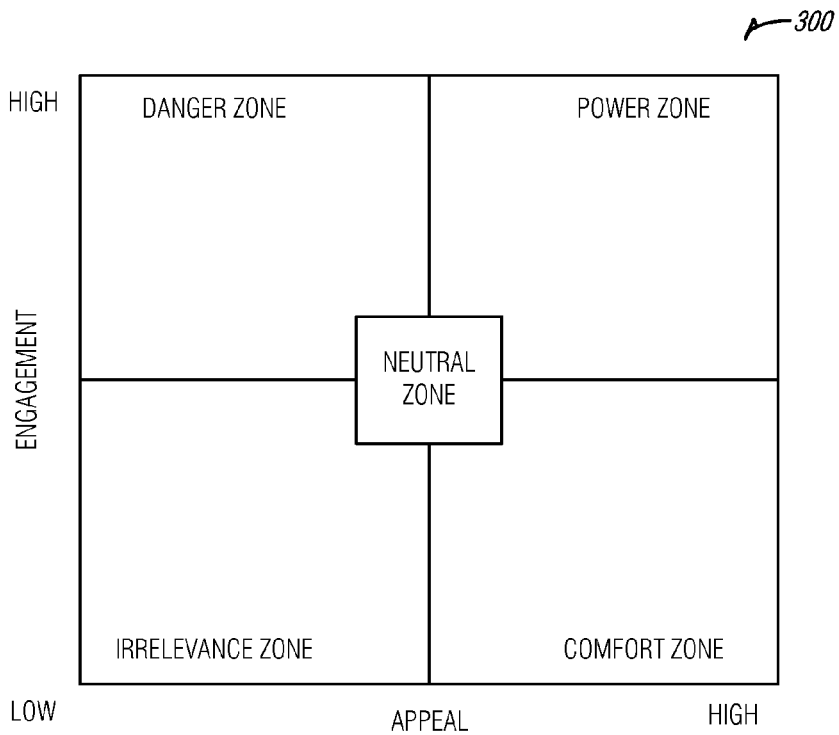
FIG. 3 illustrates an example of an emotional state chart, according to an embodiment.

FIG. 3 illustrates an example of an emotional state chart 300. The chart 300 illustrates several useful emotional concepts for use in the systems and methods described herein. Engagement (e.g., impact or intensity) represents the degree of emotional response by a subject. For example, without regard to the type of emotion observed, high engagement represents strong emotion while a low engagement represents little or no emotional response. Appeal (e.g., valence) represents whether the emotion was positive or negative. Thus, an emotional reaction that has high engagement with low appeal can be mapped into the illustrated "Danger Zone". The pertinent zone for modifying an application can vary depending on the circumstance. For example, in a horror game it may be desirable that a subject does not become comfortable while in a productivity application comfort may be the desired goal. In an example, the zone can be a summarized emotional result (e.g., part of a summarization component in emotional analysis of the subject).

Appeal can be determined by identifying particular emotions expressed by the subject. For example, anger can push an appeal rating lower while happiness can push an appeal rating higher. Engagement can be determined by observing the degree (e.g., in duration or magnitude of motion) of the subject movement corresponding to an emotion.

Specific raw emotions, such as happiness, surprise, sadness, fear, anger, disgust, or contempt can also be used directly. Determining these raw emotions can be accomplished in a variety of ways. In an example, an artificial intelligence system can be trained on subject body or face. In an example, a facial muscle movement system can be used. These systems utilize observations by Darwin and others to associate particular physical variations in a person's face to underlying emotions. One such system is the Facial Action Coding System (FACS) developed by Dr. Paul Ekman and Wally Freisen. An emotionally-focused variation of FACS is EMFACS. EMFACS includes approximately twenty action units (AU). An action unit is a discrete variation in the subject's face. The following list includes example Ails and corresponding facial locations:

1. Left eyebrow and area adjacent to it on the forehead: can relate to AU1 and AU2
2. Center of forehead and area between the eyebrows: can relate to AU4
3. Right eyebrow and area adjacent to it on the forehead: can relate to AU1 and AU2
4. Left eye, and adjacent area above and below: can relate to AU5, AU6, and AU7
5. Right eye, and adjacent area above and below: can relate to AU5, AU6, and AU7
6. Nose, from tip to base: can relate to AU9
7. Left cheek, from alongside nose and outwards: can relate to AU6, AU10, AU11, AU12, AU14 and AU20
8. Right cheek, from alongside nose and outwards: can relate to AU6, AU10, AU11, AU12, AU14 and AU20
9. Left corner of the mouth, upper and lower: can relate to AU11, AU12, AU14, AU15, AU16, AU20, AU22, AU23, and AU24
10. Middle of mouth, including area adjacent above and below: can relate to AU9, AU10, AU11, AU12, AU16, AU17, AU22, AU23, AU24, AU25, AU26, and AU27
11. Right corner of the mouth, upper and lower: can relate to AU11, AU12, AU14, AU15, AU16, AU20, AU22, AU23, and AU24
12. Lower left part of the face, from chin to mouth: can relate to AU15, AU16, AU20, AU22, and AU27
13. Lower center part of the face, from chin to mouth: can relate to AU14, AU16, AU17, AU20, AU22, AU23, AU26, and AU27
14. Lower right part of the face, from chin to mouth: can relate to AU15, AU16, AU20, AU22, and AU27.

Emotions are represented by a single AU or combinations of AUs. Other example systems can be derived from FACS or EMFACS. For example, motion in an area of the face, however measured, can be matched with emotions for AUs in the same or similar region of the face.

Figure 4:
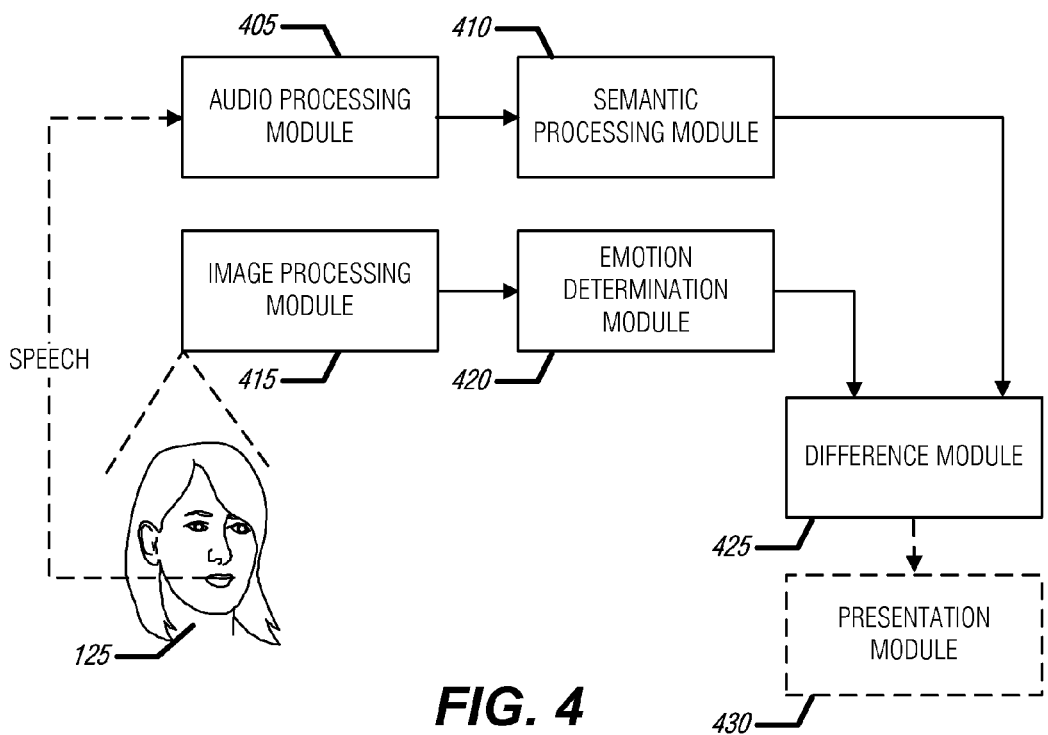
FIG. 4 illustrates an example of a system for say-feel gap identification and use, according to an embodiment.

FIG. 4 illustrates an example of a system 400 for say-feel gap identification and use. The system 400 can include an audio processing module 405, a sematic processing module 410, an image processing module 415, an emotion determination module 420, and a difference module 425. In an example, the system 400 can also include a presentation module 430. Any one or more of these modules can be on a single device, or spread among several devices (such as in a cloud computing environment).

The audio processing module 405 can be configured to receive an audio stream of the subject 125. This audio stream can correspond in time to a sequence of visual observations of the subject 125. The audio processing module 405 can produce a transcript of speech uttered in the audio stream. For example, the audio processing module 405 can receive an audio track for video of the subject and produce a transcript of that speech. In an example, the transcript can be time-coded for later matching to the video images or for other purposes. In an example, processing of the audio, including producing the transcript, can be facilitated by an external entity, such as a human.

The semantic processing module 410 can be configured to determine the meaning of a string in the transcript. The string can include a single word, a portion of a word, or a multi-word phrase. The meaning is a feeling, definition, etc., as understood by others. In an example, the "others" can be a subset of the general population.

The image processing module 415 can be configured to receive the sequence of visual observations that correspond to the speech that produced the string. For example, while video of a complete criminal suspect interview may have been captured, the sequence of visual observations may pertain only to that speech in which the subject 125 denies culpability for a crime. In an example, the image processing module 415 can be configured to capture, receive, or store sequences of subject 125 observations. In an example, the image processing module 415 can be configured to operate as discussed above with regard to FIG. 1 or 2.

The emotion determination module 420 can be configured to determine an emotional state of the subject 125 based on the sequence of visual observations. In an example, the emotion determination module can be configured to operate as discussed above with regard to FIGS. 1-3.

The difference module can be configured to calculate a correlation value for the string. In an example, the correlation value can be calculated by comparing the meaning of the string to the determined emotional state of the subject 125 for the sequence of visual images corresponding to the utterance of the string. In an example, the correlation is a binary value. For example, the correlation can simply indicate that the spoken meaning of the words does, or does not, match the observed emotional state of the subject 125. In an example, the correlation can include a magnitude component. In an example, the correlation can include one or more of an engagement component, summarization component, or emotional response component (e.g., as discussed above with regard to FIG. 3).

The presentation module 430 can be configured to present the correlation calculated by the difference module 425 to a user. In an example, the presentation module 430 can be configured to vary the intensity of the presentation based on the magnitude of the correlation. For example, if the image of flaming pants is applied to video of a speaker when the correlation indicates a say-feel gap, the size of the flames can be increased as the correlation decreases. In an example, the presentation module can be configured to play the sequence of visual observations and produce an audio representation of the emotional state along with the sequence of visual observations. For example, a bell can "ding" when there is strong correlation between the string's meaning the subject's 125 emotional state while a "buzzer" can sound when the correlation is weak. In an example, the audio representation can include modifying an aspect of the audio stream. For example, the speaker's voice be produced with more authority (e.g., louder, with more resonance, etc.) when there is strong correlation between the string's meaning and the emotional state of the subject 125.

In an example, the presentation module 430 can be configured to present the correlation (e.g., visually). For example, a transcript including the string can be modified (e.g., marked up) to illustrate the correlation. In an example, the font size used for the string can be increased or decreased from a default size. In an example, the string can be highlighted. In an example, the highlighting can vary in color, fill style (e.g., solid, striped, patterned, etc.), transparency, etc., to represent a particular emotion, or other category based on the observed emotional state.

In an example, the presentation module 430 can be configured to create a modified sequence of images and playing the modified sequence of images to the user. In an example, the modified sequence of images can include changing a portion of an image in the sequence of images. For example, the nose on the face of a speaker in which there is a low correlation can be lengthened. Other modifications can include, changing the color of the speaker, presenting an accompanying meter of the correlation, or a graphic to indicate the correlation, among others.

The system 400 can be useful in a variety of situations. For example, it can be employed by a broadcaster to provide real-time analysis for viewers or presenters. In an example, the system 400 can be used by physicians interviewing patients. In an example, the system 400 can be used by marketers or researchers when presenting (e.g., a product) or concept to the subject 125. In an example, the system 400 can be used between employers and employees (or potential employees), between co-workers, between customers and vendors, or in personal relationship interactions. Further, beyond just indicating the veracity of the subject's words, the system 400 allows the user to better understand the subject 125. For example, a patient who indicates willingness to talk about sexual activity but expresses anxiety may indicate that it is discomfort, rather than malicious intent, that prompts false statements to the physician. By understanding this, the physician can attempt to rephrase, or adopt a new approach, to gathering the requested information.

Figure 5:
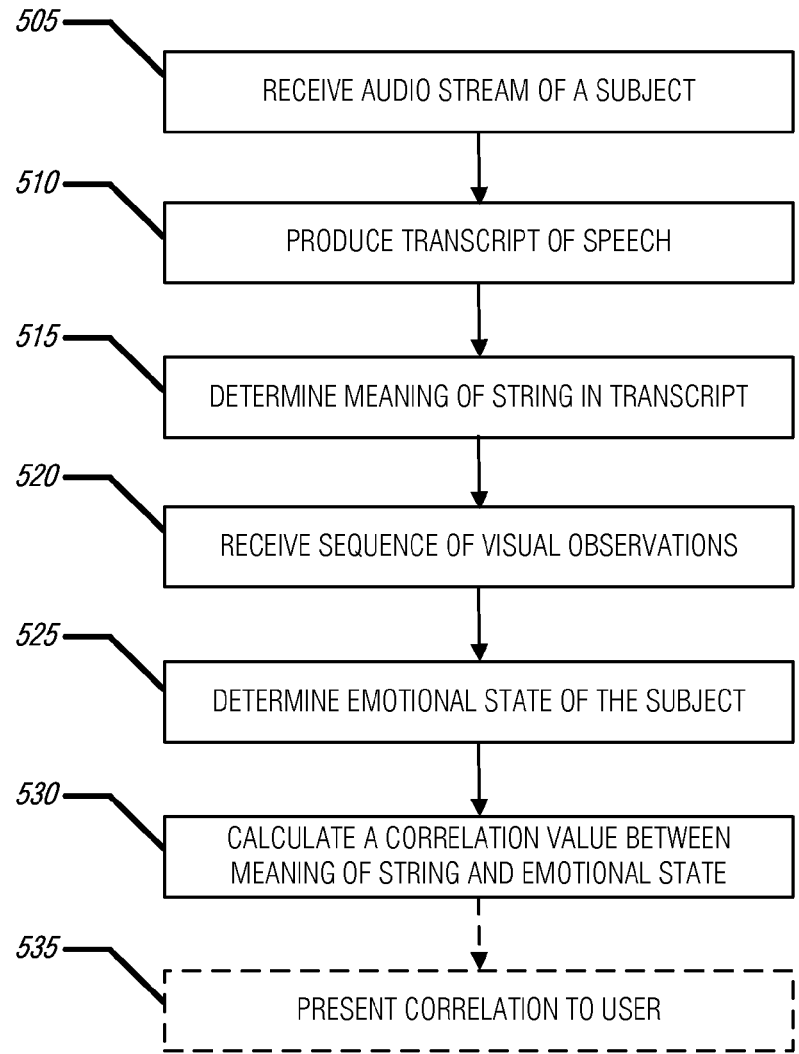
FIG. 5 illustrates an example of a method for say-feel gap identification and use, according to an embodiment.

FIG. 5 illustrates an example of a method 500 for say-feel gap identification and use. In an example, components of the system 400 can be used to implement one or more operations described below.

At operation 505, an audio stream of a subject corresponding in time to a sequence of visual observations, both of the same subject, can be received.

At operation 510, a transcript of speech uttered in the audio stream can be produced.

At operation 515, a meaning for a string in the transcript can be determined.

At operation 520, the sequence of visual observations that correspond to the speech that produced the string can be received. That is, this sequence of visual observations is directly related to the string, and is a subset of the sequence of visual observations corresponding to the entire audio stream.

At operation 525, an emotional state of the subject can be determined based on the sequence of visual observations.

At operation 530, a correlation value can be calculated for the string by comparing the meaning and the emotional state.

At operation 535, the correlation can be presented to a user. In an example, presenting the correlation can include playing the sequence of visual observations (e.g., a video) and producing an audio representation with the sequence of visual observations. In an example, the audio representation can include a modified aspect of the audio stream. For example, the pitch, tone, or magnitude of the speaker's voice can be manipulated to express the correlation. In an example, background music can be selectively added to represent the correlation (e.g., ominous music to indicate deception or seriousness, and light-hearted music to indicate happiness, joy, etc.).

In an example, presenting the correlation can include presenting a visual indication of the emotional state in a representation of the transcript corresponding to the string. In this example, one or more strings of text can be produced from the audio stream. These strings can be presented to the user. For example the presentation can include closed-captioning in video streams or written transcripts (e.g., as on a webpage), among others. In an example, the string can be color coded (e.g., highlighted in a particular color) to represent the emotional state. In an example, the string can be enlarged or shrunk to represent the emotional state. Other modifications to the string, such as changing the font, replacing the string with a graphic, adding an accompanying graphic, can also be used to represent the emotional state.

In an example, presenting the correlation between the meaning of the string and the emotional state can include creating a modified sequence of images by changing a portion of an image in the sequence of images, and playing the modified sequence of images. In an example, a speaker's features in a video can be modified to represent the correlation. For example, a speaker who lacks confidence in what they are saying may have their nose lengthened. In an example, a color can be superimposed upon the speaker to represent the correlation. For example, a semi-transparent green can overlay the speaker's face on a video stream.

In an example, presenting the correlation can include varying an intensity of the presentation based on the magnitude of the correlation. For example, if the correlation is strong (e.g., little difference between the meaning of the string and the observed emotional state) a small variation can be presented. Conversely, where the correlation is weak, a large variation can be presented.

In an example, the correlation can include an engagement component. In an example, the correlation can include a summarization component. In an example, the correlation can include an emotional response component. The emotional response component can include at least one measure for impact or appeal. In an example, these components are defined above with regard to FIG. 3.

FIG. 6 illustrates an example of a system 600 for facilitating human facial coders. The system 600 can include an identification module 605, an enhancement module 610, and a presentation module 615. The system 600 can be used to facilitate manual facial coding by identifying or enhancing movements of a subject's face as well as change the operation of the coding system (e.g., selecting candidate emotions).

The identification module 605 can be configured to identify a media aspect of a media source based on an emotional determination system. A media aspect is observable when the media source is presented to a user. Examples of media aspects can include: a window in time of, for example, a sequence of visual observations of the subject; a region of one or more frames of video, a region of the subject's face or body that is visible in the sequence of visual observations, etc. The emotional determination system can be any system designed to determine a subject's emotions via physical observation (e.g., visually, electrically, heat, tactilely, etc.). In an example, non-visual observations (e.g., tactile observations) can be converted into visual observations. In an example, the emotional determination system is based on the FACS or EMFACS systems discussed above with regard to FIG. 3. In an example, the media aspect is a portion of a subject's face corresponding to an action unit of the FACS or EMFACS systems. In an example, the media aspect includes the portion of the subject's face spanning a subset of the sequence of visual observations corresponding to a change in the facial portion from a baseline. For example, the media aspect can include the frames of video in which (or slightly before and after) a subject's mouth corner indicates a true smile. In an example, the media aspect can include multiple portions of the subject's face corresponding to a single AU. In an example, the media aspect can include multiple portions of the face corresponding to multiple AUs. In an example, the multiple AUs can represent a single emotion.

In an example, the baseline can be adjusted based on the subject's speech to correct for interference from particular vocal articulations in a facial movement. For example, for facial coding when a subject is talking, it may be difficult to separate emotive facial muscle movements and those attributable to articulate sounds for speech. For example, when a person says "slippery" the mouth contorts differently than when a person says a word like "explosive." "Explosive" is likely to cause the upper lip to flare in a way that a human facial coder may be mistakenly identified as AU10. The baseline determination can take into account such a problem to avoid false media aspect identifications. In an example, an audio system can be configured to detect speech to identify when a possible AU occurs just prior to a person speaking, during a pause, or immediately after a given utterance. Thus, passages of time can be identified when the simpler, non-verbal form of coding can occur, and media aspect identification can be limited to these passages.

In an example, linguistics and prosody research can be used as a model such that plosives (e.g., as in "explosive" with its "p's"), or "s" sounds, etc., can be used indicate whether an emotional component is expressed (e.g., in AU terms) or whether in fact the observed facial muscle movements are merely a part of how the word is being articulated. In an example, the prosody model can vary depending upon the language being spoken by the subject.

The enhancement module 610 can be configured to produce an enhanced media source. The enhanced media source can include an indicator of the media aspect identified by the identification module 605. In an example, the enhancement module 610 can be configured to create a user observable indicator of the media aspect. For example, the user observable indicator is a measurement of the change to the portion of the subject's face described above. In an example, the measurement can include the duration of the change. In an example, the measurement can include a magnitude of the change. For example, the magnitude can represent the distance the subject's eyebrow was raised. In an example, the magnitude can be a ratio of the change and the subject's face.

The presentation module can be configured to present the enhanced media source to the user. In an example, the presentation can include displaying video, presenting a user interface, etc. Additional examples are discussed below with regard to FIGS. 7-10.

FIG. 7 illustrates an example of a media source 700 of facial images, according to an embodiment. In this example, the media source is a video including a sequence of facial images. As illustrated, the sequence of visual observations (e.g., facial images) includes a change in the subject's right eyebrow and mouth. The baseline visual image 705 illustrates the subject's face immediately prior to the change. Visual image 710 is the first to illustrate the change. The subset of visual images 715 represents those images in which the change is present. Visual image 720 illustrates the subject's face returning to the baseline following the change. This illustration is used below to describe examples of media aspect identification, user observable indicator creation, and presentation of the enhanced media source.

FIG. 8 illustrates an example of a facial image 800 with identified media aspects. The illustrated media aspects correspond to the facial changes introduced above in the media source 700. In an example, portions of the subject's face can be predetermined to be relevant. For example, the subject's face can be divided into a virtual grid of areas of interest. In an example, this grid can correspond to the AIls described above with regard to FIG. 3. As illustrated, the portions 805, 810, and 815 are identified media aspects of this scenario. Each portion corresponds to an emotionally relevant facial motion.

FIG. 9 illustrates an example of an enhanced media source 900. Taking the identified media aspects of the facial image 800, the enhanced media source 900 can be created. In this example, the user observable indicator is an enlargement of the portion of the subject's face corresponding to each media aspect. For example, user observable indicator 905 is an enlargement of the facial portion 805 and user observable indicator 910 is an enlargement of both facial portions 810 and 815. In an example, other manipulations of the underlying facial image can be used to create the user observable indicator. Examples can include: circling, shading, or highlighting. In an example, the color of these manipulations can be used to indicate a possible emotion or underlying emotional component (e.g., AU). In an example, the user observable indicator can include removing any part of the image not directly associated with a particular emotional component. For example, the user observable indicator 905 can be left while the rest of the visual image 800 is removed. Accordingly, distribution of the media aspect 805 to different manual coders can be facilitated. This distribution can be used to, for example, enable a crowd or group sourcing model to perform the facial coding.

Figure 10:
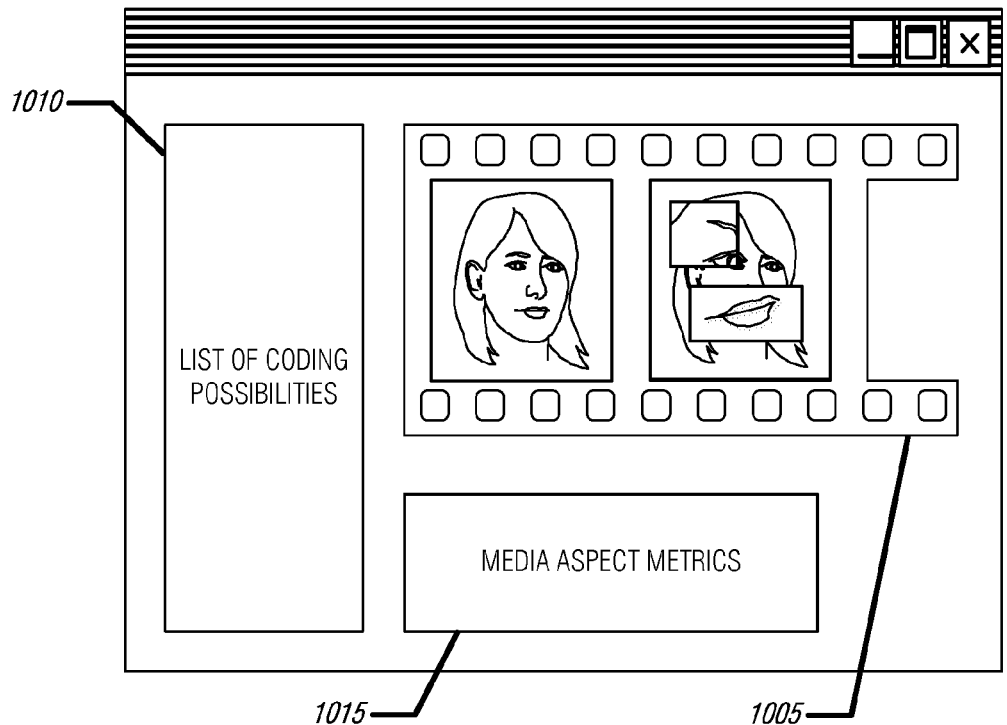
FIG. 10 illustrates an example of a user interface to present an enhanced media source to a user, according to an embodiment.

FIG. 10 illustrates an example of a user interface 1000 to present an enhanced media source to a user. The user interface 1000 can include the enhanced media source 1005, an emotional component interface 1010, and a media aspect metrics interface. Additional controls can also be included in the user interface 1000, such as playback controls, project interface controls, etc. In an example, the previously introduced user observable indicator can include slowing playback of the sequence of visual images. Thus, a manual coder can have the playback automatically slowed during interesting periods and, possibly, sped up at less interesting periods.

The emotional component interface 1010 can be configured to display available emotional component choices to the user. In an example, the list of available emotional components can be reduced based on the media aspect. This reduction of listed emotional components can help reduce errors by removing, for example, AUs that are not possible with a given media aspect.

The media aspect metric interface 1015 can be configured to present metrics of one or more media aspects. For example, the duration or magnitude of a given media aspect can be displayed. These metrics can facilitate decisions by the manual coder of such things like engagement of the subject. In an example, the media aspect metrics interface 1015 can be configured to indicate whether a media aspect is positive or negative. Such an indication can facilitate the manual coder to determine appeal in the subject.

Figure 11:
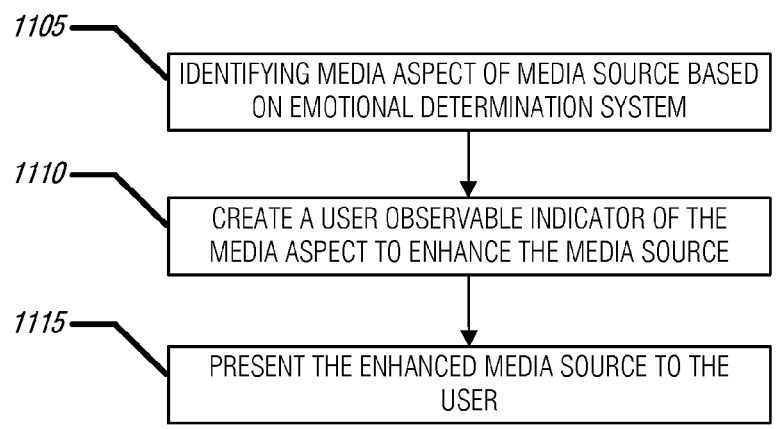
FIG. 11 illustrates an example of a method for facilitating human facial coders, according to an embodiment.

FIG. 11 illustrates an example of a method 1100 for facilitating human facial coders. In an example, components of the system 600 or the user interface 1000 can be used to implement one or more operations described below.

At operation 1105, a media aspect of a media source can be identified based on an emotional determination system. The media aspect can be observable (e.g., visually, audibly, tactilely, etc.) when the media source is presented to a user. The media source can include a sequence of visual observations of a subject. In an example, the media aspect can span a subset of the sequence of visual observations. For example, the media source can be a video stream and the media aspect can be a part of a scene, such as a region of the screen over a number of frames of the video stream. Other media aspects can include particular frames, features of the subject's face or body, etc.

In an example, the emotional determination system is based on the FACS or EMFACS systems described above with regard to FIG. 3. In an example, the media aspect can be a portion of a face of the subject corresponding to an action unit of the FACS system. In an example, the media aspect includes an additional portion of the face corresponding to an additional action unit. For example, the media aspect can include multiple facial regions each corresponding to different action units.

In an example, the emotional determination system can include an artificial intelligence (e.g., neural network) system trained against a number of faces. These systems can define parameters, areas of the face, facial baseline procedures, duration of facial muscle movements, and relevant combinations of muscle movements, among other things, to inform what portions of the media source are pertinent to the human facial coder.

At operation 1110, an enhanced media source can be produced by creating a user observable indicator of the media aspect. In an example, the user observable indicator can include a listing of the action unit and the additional action unit synchronized with the media aspect. For example, instead of having to select from the complete list of actions units, the user can be presented with a subset of the list based on the media aspect (e.g., only valid action units for the identified facial regions).

The subset of the sequence of visual observations can correspond to a change in the portion of the face from a baseline. In an example, the user observable indicator can be a measurement of the change. For example, the indicator can include a duration for the change, a magnitude of the change, etc. In an example, the user observable indicator can be an enlargement of the portion in the subset. In an example, the user observable indicator can include slowing playback of the sequence of images. In an example, the user observable indicator can include a color change for the portion of the face. For example, a semi-transparent yellow can overlay the portion of the face that changed. In an example, the specific color can represent a specific action unit or group of action units. IN an example a circling, or other attention drawing marker (e.g., an arrow) can be used to alert the human coder to motion in a relevant portion of the subject's face.

At operation 1115, the enhanced media source can be presented to the user.

Figure 12:
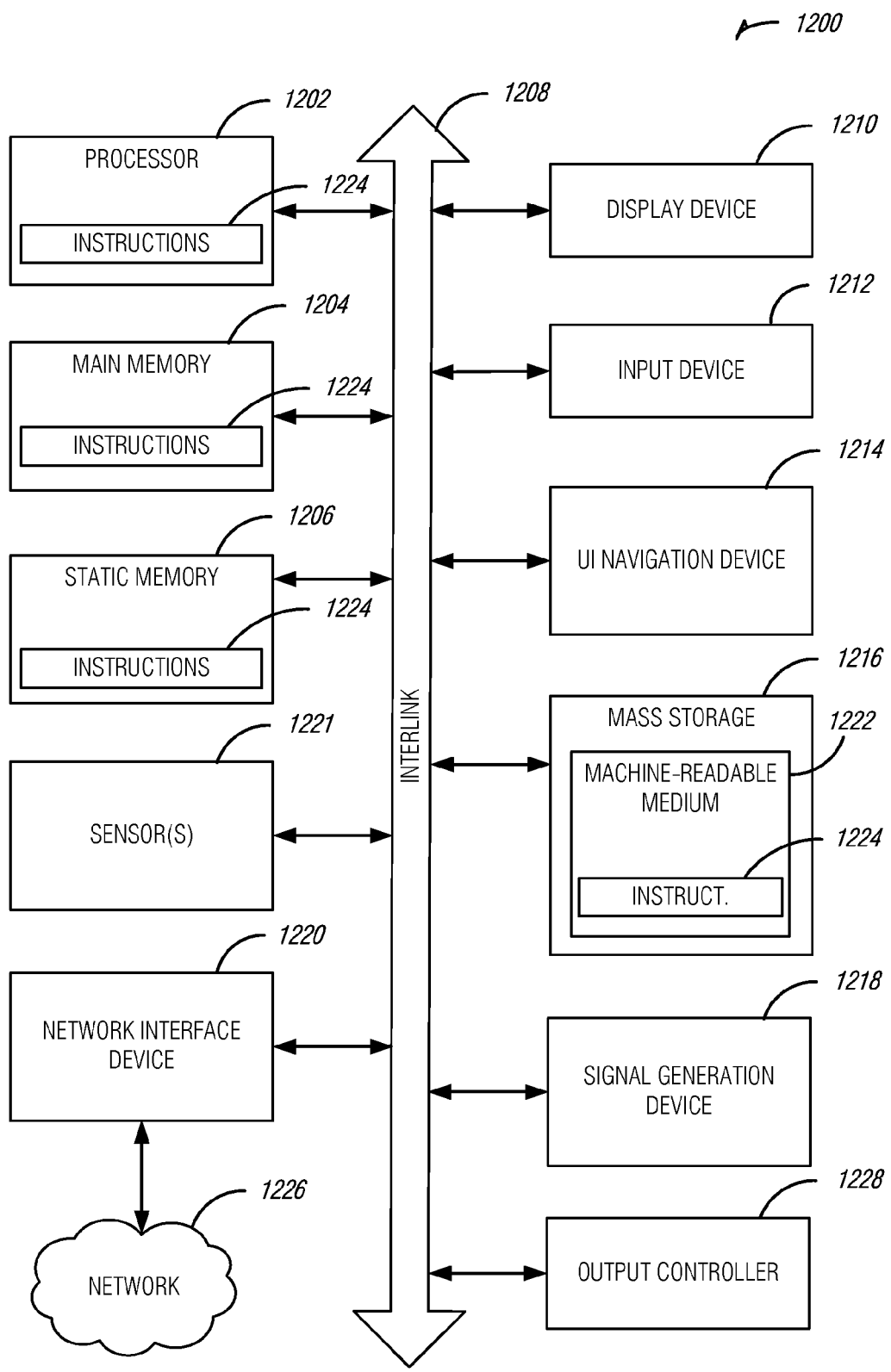
FIG. 12 is a block diagram illustrating an example of a machine upon which one or more embodiments may be implemented.

FIG. 12 illustrates a block diagram of an example of a machine 1200 upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) that configured to store the one or more instructions 1224. The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

ADDITIONAL NOTES & EXAMPLES

Example 1 can include subject matter (such as a device, apparatus, or system) comprising device comprising an image processing module configured to receive a sequence of visual observations of a subject during the execution of an application, an emotion determination module configured to determine an emotional state of the subject based on the sequence of visual observations, and a modification module configured to modify the execution of the application from a baseline execution using the emotional state.

In Example 2, the subject matter of Example 1 can optionally include, wherein the emotion determination module is configured to identify a stimulus corresponding to the determined emotional state.

In Example 3, the subject matter of Example 2 can optionally include, wherein to modify the execution of the application includes the modification module configured to store a correlation between the emotional state and the stimulus.

In Example 4, the subject matter of Example 3 can optionally include, wherein the application is a social media application, wherein the stimulus is an article presented to the subject by the social media application, and wherein the correlation is an indication of at least one of like, dislike, or neutral indication of the article, the indication selected based on the emotional state.

In Example 5, the subject matter of any one or more of Examples 3-4 can optionally include, wherein the application is a consumer marketing application, wherein the stimulus is presented in a consumer context, and wherein the correlation is a representation of the emotional state in a modified sequence of images correlated to the stimulus, the modified sequence of images including the sequence of images.

In Example 6, the subject matter of any one or more of Examples 2-5 can optionally include, wherein the application is an interactive application, wherein the stimulus is a portion of the application for which help is available, wherein the emotional state crosses a threshold from a baseline emotional state, and wherein the modification module is configured to present the help to the subject.

In Example 7, the subject matter of any one or more of Examples 2-6 can optionally include, wherein the application is an interactive application, wherein the stimulus is an element of the interactive application, wherein the element is one of a plurality of alternative items, and wherein the modification module is configured to select a next element from the plurality of alternative items based on the emotional state, the next element replacing the element in the interactive application.

In Example 8, the subject matter of any one or more of Examples 1-7 can optionally include, wherein the application is a monitoring application, wherein the emotional state crosses a threshold from a baseline emotional state, and wherein the modification module is configured to intervene on behalf of the subject.

In Example 9, the subject matter of Example 8, wherein to intervene, the modification module is configured to present an alarm to at least one of the subject or a user.

In Example 10, the subject matter of any one or more of Examples 9-8 can optionally include, wherein to intervene, the modification module is configured to manipulate a physical aspect of an environment of the subject.

Example 11 can include, or can optionally be combined with the subject matter of any one or more of Examples 1-15 to include, subject matter (such as a method, means for performing acts, or machine readable medium including instructions that, when performed by a machine cause the machine to perform acts) comprising receiving a sequence of visual observations of a subject during the execution of an application, determining an emotional state of the subject based on the sequence of visual observations, and modifying the execution of the application from a baseline execution using the emotional state.

In Example 12, the subject matter of Example 11 can optionally include, wherein the operations comprise identifying a stimulus corresponding to the determined emotional state.

In Example 13, the subject matter of Example 12 can optionally include, wherein modifying the execution of the application includes storing a correlation between the emotional state and the stimulus.

In Example 14, the subject matter of Example 13 can optionally include, wherein the application is a social media application, wherein the stimulus is an article presented to the subject by the social media application, and wherein the correlation is an indication of at least one of like, dislike, or neutral indication of the article, the indication selected based on the emotional state.

In Example 15, the subject matter of any one or more of Examples 13-14 can optionally include, wherein the application is a consumer marketing application, wherein the stimulus is presented in a consumer context, and wherein the correlation is a representation of the emotional state in a modified sequence of images correlated to the stimulus, the modified sequence of images including the sequence of images.

In Example 16, the subject matter of any one or more of Examples 12-15 can optionally include, wherein the application is an interactive application, wherein the stimulus is a portion of the application for which help is available, wherein the emotional state crosses a threshold from a baseline emotional state, and wherein the operations comprise presenting the help to the subject.

In Example 17, the subject matter of any one or more of Examples 12-16 can optionally include, wherein the application is an interactive application, wherein the stimulus is an element of the interactive application, wherein the element is one of a plurality of alternative items, and wherein the operations comprise selecting a next element from the plurality of alternative items based on the emotional state, the next element replacing the element in the interactive application.

In Example 18, the subject matter of any one or more of Examples 11-17 can optionally include, wherein the application is a monitoring application, wherein the emotional state crosses a threshold from a baseline emotional state, and wherein the operations comprise intervening on behalf of the subject.

In Example 19, the subject matter of Example 18 can optionally include, wherein the intervening includes presenting an alarm to at least one of the subject or a user.

In Example 20, the subject matter of any one or more of Examples 18-19 can optionally include, wherein the intervening includes manipulating a physical aspect of an environment of the subject.

Example 21 can include, or can optionally be combined with the subject matter of any one or more of Examples 1-50 to include, subject matter (such as a device, apparatus, or system) comprising an audio processing module, a semantic processing module, an image processing module, an emotion determination module, a difference module. The audio processing module can be configured to receive an audio stream of a subject corresponding in time to a sequence of visual observations of the subject, and produce a transcript of speech uttered in the audio stream. The semantic processing module can be configured to determine a meaning of a string in the transcript. The image processing module can be configured to receive the sequence of visual that correspond to speech that produced the string. The emotion determination module can be configured to determine an emotional state of the subject based on the sequence of visual observations. The difference module can be configured to calculate a correlation value for the string by comparing the meaning and the emotional state.

In Example 22, the subject matter of Example 21 can optionally include a presentation module configured to present the correlation to a user.

In Example 23, the subject matter of Example 22 can optionally include, wherein to present the correlation includes the presentation module configured to play the sequence of visual observations, and produce an audio representation with the sequence of visual observations.

In Example 24, the subject matter of Example 23 can optionally include, wherein the audio representation includes a modified aspect of the audio stream.

In Example 25, the subject matter of any one or more of Examples 22-24 can optionally include, wherein to present the correlation includes the presentation module configured to present a visual indication of the emotional state in a representation of the transcript corresponding to the string.

In Example 26, the subject matter of any one or more of Examples 22-25 can optionally include, wherein to present the correlation includes the presentation module configured to create a modified sequence of images by changing a portion of an image in the sequence of images, and play the modified sequence of images.

In Example 27, the subject matter of any one or more of Examples 22-26 can optionally include, wherein to present the correlation, the presentation module is configured to vary an intensity of the presentation based on the magnitude of the correlation.

In Example 28, the subject matter of any one or more of Examples 21-27 can optionally include, wherein the correlation includes an engagement component.

In Example 29, the subject matter of any one or more of Examples 21-28 can optionally include, wherein the correlation includes a summarization component.

In Example 30, the subject matter of any one or more of Examples 21-29 can optionally include, wherein the correlation includes an emotional response component, the emotional response component including at least one of impact or appeal.

Example 31 can include, or can optionally be combined with the subject matter of any one or more of Examples 1-15 to include, subject matter (such as a method, means for performing acts, or machine readable medium including instructions that, when performed by a machine cause the machine to perform acts) comprising receiving an audio stream of a subject corresponding in time to a sequence of visual observations of the subject, producing a transcript of speech uttered in the audio stream, determining a meaning of a string in the transcript, receiving the sequence of visual observations that correspond to speech that produced the string, determining an emotional state of the subject based on the sequence of visual observations, and calculating a correlation value for the string by comparing the meaning and the emotional state.

In Example 32, the subject matter of Example 31 can optionally include, wherein the operations comprise presenting the correlation to a user.

In Example 33, the subject matter of Example 32 can optionally include, wherein presenting the correlation includes playing the sequence of visual observations, and producing an audio representation with the sequence of visual observations.

In Example 34, the subject matter of Example 33 can optionally include, wherein the audio representation includes a modified aspect of the audio stream.

In Example 35, the subject matter of any one or more of Examples 32-33 can optionally include, wherein presenting the correlation includes presenting a visual indication of the emotional state in a representation of the transcript corresponding to the string.

In Example 36, the subject matter of any one or more of Examples 32-35 can optionally include, wherein presenting the correlation includes creating a modified sequence of images by changing a portion of an image in the sequence of images, and playing the modified sequence of images.

In Example 37, the subject matter of any one or more of Examples 32-36 can optionally include, wherein presenting the correlation includes varying an intensity of the presentation based on the magnitude of the correlation.

In Example 38, the subject matter of any one or more of Examples 31-37 can optionally include, wherein the correlation includes an engagement component.

In Example 39, the subject matter of any one or more of Examples 31-38 can optionally include, wherein the correlation includes a summarization component.

In Example 40, the subject matter of any one or more of Examples 31-39 can optionally include, wherein the correlation includes an emotional response component, the emotional response component including at least one of impact or appeal.

Example 41 can include, or can optionally be combined with the subject matter of any one or more of Examples 1-40 to include, subject matter (such as a device, apparatus, or system) comprising an identification module configured to identify a media aspect of a media source based on an emotional determination system—the media aspect being observable when the media source is presented to a user—and the media source including a sequence of visual observations of a subject, an enhancement module configured to produce an enhanced media source by creating a user observable indicator of the media aspect, and a presentation module configured to present the enhanced media source to the user.

In Example 42, the subject matter of Example 41 can optionally include, wherein the emotional determination system is based on a Facial Action Coding (FACS) system.

In Example 43, the subject matter of Example 42 can optionally include, wherein the media aspect is a portion of a face of the subject corresponding to an action unit of the FACS system.

In Example 44, the subject matter of Example 43 can optionally include, wherein the media aspect spans a subset of the sequence of visual observations, the subset corresponding to a change in the portion of the face from a baseline.

In Example 45, the subject matter of Example 44 can optionally include, wherein the user observable indicator is a measurement of the change.

In Example 46, the subject matter of any one or more of Examples 44-45 can optionally include, wherein the user observable indicator is an enlargement of the portion in the subset.

In Example 47, the subject matter of any one or more of Examples 44-46 can optionally include, wherein the user observable indicator includes slowing playback of the sequence of images In Example 48, the subject matter of any one or more of Examples 43-47 can optionally include, wherein the media aspect includes an additional portion of the face corresponding to an additional action unit.

In Example 49, the subject matter of Example 48 can optionally include, wherein the user observable indicator includes a listing of the action unit and the additional action unit synchronized with the media aspect.

In Example 50, the subject matter of any one or more of Examples 43-49 can optionally include, wherein the user observable indicator includes a color change for the portion of the face.

Example 51 can include, or can optionally be combined with the subject matter of any one or more of Examples 1-50 to include, subject matter (such as a method, means for performing acts, or machine readable medium including instructions that, when performed by a machine cause the machine to perform acts) comprising identifying a media aspect of a media source based on an emotional determination system—the media aspect being observable when the media source is presented to a user—and the media source including a sequence of visual observations of a subject, producing an enhanced media source by creating a user observable indicator of the media aspect, and presenting the enhanced media source to the user.

In Example 52, the subject matter of Example 51 can optionally include, wherein the emotional determination system is based on a Facial Action Coding (FACS) system.

In Example 53, the subject matter of Example 52 can optionally include, wherein the media aspect is a portion of a face of the subject corresponding to an action unit of the FACS system.

In Example 54, the subject matter of Example 53 can optionally include, wherein the media aspect spans a subset of the sequence of visual observations, the subset corresponding to a change in the portion of the face from a baseline.

In Example 55, the subject matter of Example 54 can optionally include, wherein the user observable indicator is a measurement of the change.

In Example 56, the subject matter of any one or more of Examples 54-55 can optionally include, wherein the user observable indicator is an enlargement of the portion in the subset.

In Example 57, the subject matter of any one or more of Examples 54-56, wherein the user observable indicator includes slowing playback of the sequence of images In Example 58, the subject matter of any one or more of Examples 53-57, wherein the media aspect includes an additional portion of the face corresponding to an additional action unit.

In Example 59, the subject matter of Example 58 can optionally include, wherein the user observable indicator includes a listing of the action unit and the additional action unit synchronized with the media aspect.

In Example 60, the subject matter of any one or more of Examples 53-59 can optionally include, wherein the user observable indicator includes a color change for the portion of the face.

The above detailed description includes references to the accompanying drawings, which form a part of the detailed description. The drawings show, by way of illustration, specific embodiments in that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device comprising:
   an image processing module configured to receive a sequence of visual observations of a subject during the execution of an application, wherein the application is a social media application;
   an emotion determination module configured to:
      determine an emotional state of the subject based on the sequence of visual observations; and
      identify a stimulus corresponding to the determined emotional state, wherein the stimulus is an article presented to the subject by the social media application; and
   a modification module, implemented by a processor, configured to modify the execution of the application from a baseline execution using the emotional state, wherein to modify the execution of the application includes the modification module configured to store a correlation between the emotional state and the stimulus, and wherein the correlation is an indication of at least one of like, dislike, or neutral indication of the article, the indication selected based on the emotional state.

2. A non-transitory machine-readable medium comprising instructions that, when executed by a machine, cause the machine to perform operations comprising:
- receiving a sequence of visual observations of a subject during the execution of an application, wherein the application is a social media application;
- determining an emotional state of the subject based on the sequence of visual observations;
- identifying a stimulus corresponding to the determined emotional state, wherein the stimulus is an article presented to the subject by the social media application; and
- modifying the execution of the application from a baseline execution using the emotional state, wherein modifying the execution of the application includes storing a correlation between the emotional state and the stimulus, and wherein the correlation is an indication of at least one of like, dislike, or neutral indication of the article, the indication selected based on the emotional state.

3. A method comprising:
- receiving a sequence of visual observations of a subject during the execution of an application, wherein the application is a social media application;
- determining an emotional state of the subject based on the sequence of visual observations;
- identifying a stimulus corresponding to the determined emotional state, wherein the stimulus is an article presented to the subject by the social media application; and
- modifying the execution of the application from a baseline execution using the emotional state, wherein modifying the execution of the application includes storing a correlation between the emotional state and the stimulus, and wherein the correlation is an indication of at least one of like, dislike, or neutral indication of the article, the indication selected based on the emotional state.

4. The device of claim 1, wherein the storing the correlation includes storing a numerical value for the correlation.

5. The device of claim 4, wherein the numerical value is a magnitude of the emotional state that resulted in the indication of at least one of like, dislike, or neutral.

6. The device of claim 1, wherein the article is a post by another member of the social media application.

7. The device of claim 1, wherein the article is a product displayed by the social media application.

8. The machine readable medium of claim 2, wherein the storing the correlation includes storing a numerical value for the correlation.

9. The machine readable medium of claim 8, wherein the numerical value is a magnitude of the emotional state that resulted in the indication of at least one of like, dislike, or neutral.

10. The machine readable medium of claim 2, wherein the article is a post by another member of the social media application.

11. The machine readable medium of claim 2, wherein the article is a product displayed by the social media application.

12. The method of claim 3, wherein the storing the correlation includes storing a numerical value for the correlation.

13. The method of claim 12, wherein the numerical value is a magnitude of the emotional state that resulted in the indication of at least one of like, dislike, or neutral.

14. The method of claim 3, wherein the article is a post by another member of the social media application.

15. The method of claim 3, wherein the article is a product displayed by the social media application.

* * * * *